|||||||||||||||||||||||||||||||||||||||
US012510659B2

(12) United States Patent
Bui-Van et al.

(10) Patent No.: US 12,510,659 B2
(45) Date of Patent: Dec. 30, 2025

(54) VEHICULAR RADAR SENSING SYSTEM WITH TRANSMITTING AND RECEIVING ANTENNAS ON SAME PLATFORM WITH ISOLATED WAVEGUIDE PORTS

(71) Applicant: Magna Electronics Inc., Auburn Hills, MI (US)

(72) Inventors: Ha Bui-Van, Aschaffenburg (DE); Christian Mai, Grossostheim (DE); Wilhelm Johann Wolfgang Wöhlte, Sailauf (DE)

(73) Assignee: Magna Electronics Inc., Auburn Hills, MI (US)

( * ) Notice: Subject to any disclaimer, the term of this patent is extended or adjusted under 35 U.S.C. 154(b) by 350 days.

(21) Appl. No.: 18/188,586

(22) Filed: Mar. 23, 2023

(65) Prior Publication Data

US 2023/0305142 A1 Sep. 28, 2023

Related U.S. Application Data

(60) Provisional application No. 63/269,851, filed on Mar. 24, 2022.

(51) Int. Cl.
*G01S 13/931* (2020.01)
(52) U.S. Cl.
CPC ..... *G01S 13/931* (2013.01); *G01S 2013/9327* (2020.01)

(58) Field of Classification Search
CPC .. G01S 13/931; G01S 2013/9327; G01S 7/03; G01S 2013/93275; G01S 7/4813; H01Q 13/06; H01Q 21/064; H01Q 1/32; H01Q 1/526
See application file for complete search history.

(56) References Cited

U.S. PATENT DOCUMENTS

| | | | |
|---|---|---|---|
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,354 B2 | 2/2004 | Sze | |
| 6,710,770 B2 | 3/2004 | Tomasi et al. | |
| 6,876,775 B2 | 4/2005 | Torunoglu | |
| 6,906,793 B2 | 6/2005 | Bamji et al. | |
| 6,919,549 B2 | 7/2005 | Bamji et al. | |

(Continued)

*Primary Examiner* — Ladimir Magloire
*Assistant Examiner* — Naomi M Wolford
(74) *Attorney, Agent, or Firm* — HONIGMAN LLP

(57) ABSTRACT

A vehicular radar sensing system includes a radar sensor disposed at a vehicle and having a printed circuit board (PCB). The radar sensor includes an antenna structure having a transmitting port for a transmitter of the radar sensor and a receiving port for a receiver of the radar sensor. The antenna structure includes a wall structure that extends from a first side of the antenna structure toward a first side of the PCB to at least partially define a transmitting area and a receiving area to isolate radio frequency signals at the transmitting area from radio frequency signals at the receiving area. The antenna structure includes a transmitting wave-guide that guides transmitted radio signals from the transmitter through the transmitting area to the transmitting port. The antenna structure includes a receiving wave-guide that guides received radio signals from the receiving port through the receiving area to the receiver.

20 Claims, 7 Drawing Sheets

(56) References Cited

U.S. PATENT DOCUMENTS

| | | |
|---|---|---|
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,603,097 B2 * | 10/2009 | Leblanc .................. G01S 7/032 455/90.3 |
| 8,013,780 B2 | 9/2011 | Lynam |
| 8,027,029 B2 | 9/2011 | Lu et al. |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 9,869,762 B1 | 1/2018 | Alland et al. |
| 9,954,955 B2 | 4/2018 | Davis et al. |
| 10,866,306 B2 | 12/2020 | Maher et al. |
| 11,294,028 B2 | 4/2022 | Gentili et al. |
| 11,454,719 B2 | 9/2022 | Hess et al. |
| 12,013,480 B2 | 6/2024 | Hess et al. |
| 2010/0245066 A1 | 9/2010 | Sarioglu et al. |
| 2012/0050125 A1 | 3/2012 | Leiba et al. |
| 2015/0346322 A1 | 12/2015 | Schmalenberg et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0231635 A1 | 8/2018 | Woehlte |
| 2019/0124238 A1 | 4/2019 | Byrne et al. |
| 2019/0124243 A1 | 4/2019 | Mleczko et al. |
| 2019/0306966 A1 | 10/2019 | Byrne et al. |
| 2019/0339382 A1 | 11/2019 | Hess et al. |
| 2019/0348746 A1 | 11/2019 | Gupta et al. |
| 2020/0001787 A1 | 1/2020 | Lu et al. |
| 2020/0033549 A1 | 1/2020 | Liu et al. |
| 2020/0137926 A1 | 4/2020 | Wohlte |
| 2020/0166637 A1 | 5/2020 | Hess et al. |
| 2023/0035968 A1 | 2/2023 | Wodrich et al. |
| 2023/0420857 A1 * | 12/2023 | Garcia Tejero ......... G01S 7/027 |

* cited by examiner

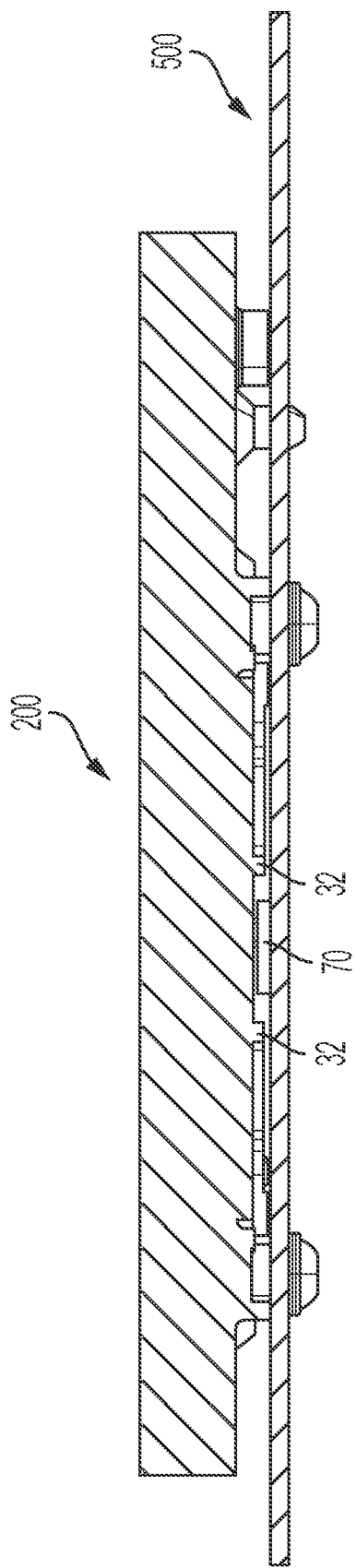

VEHICULAR RADAR SENSING SYSTEM WITH TRANSMITTING AND RECEIVING ANTENNAS ON SAME PLATFORM WITH ISOLATED WAVEGUIDE PORTS

CROSS REFERENCE TO RELATED APPLICATION

The present application claims the filing benefits of U.S. provisional application Ser. No. 63/269,851, filed Mar. 24, 2022, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A vehicular radar sensing system includes a radar sensor disposed at a vehicle that is operable to sense exterior of the vehicle. The radar sensor includes a printed circuit board (PCB) with electronic circuitry and associated software. The electronic circuitry includes (i) a plurality of transmitters that transmit radio signals and (ii) a plurality of receivers that receive the transmitted radio signals. The electronic circuitry also includes a processor disposed at a first side of the PCB that is operable to process outputs of the plurality of receivers. The radar sensor includes an antenna structure. A first side of the antenna structure is mounted at the first side of the PCB. The antenna structure includes (i) a transmitting port for at least one transmitter of the plurality of transmitters and (ii) a receiving port for at least one receiver of the plurality of receivers. The antenna structure also includes a wall structure that extends from the first side of the antenna structure toward the first side of the PCB. The wall structure and the first side of the PCB cooperate to at least partially define a transmitting area and a receiving area and the wall structure, the first side of the antenna structure, and the first side of the PCB isolate radio frequency signals at the transmitting area from radio frequency signals at the receiving area. The antenna structure includes a transmitting wave-guide that guides transmitted radio signals from the at least one transmitter through the transmitting area to the transmitting port and a receiving wave-guide that guides received radio signals from the receiving port through the receiving area to the at least one receiver.

These and other objects, advantages, purposes and features of the present invention will become apparent upon review of the following specification in conjunction with the drawings.

BRIEF DESCRIPTION OF THE DRAWINGS

FIG. 7 is a side view of the radar module of FIGS. 5 and 6.

DESCRIPTION OF THE PREFERRED EMBODIMENTS

A vehicle sensing system and/or driver assist system and/or driving assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Figure 1:
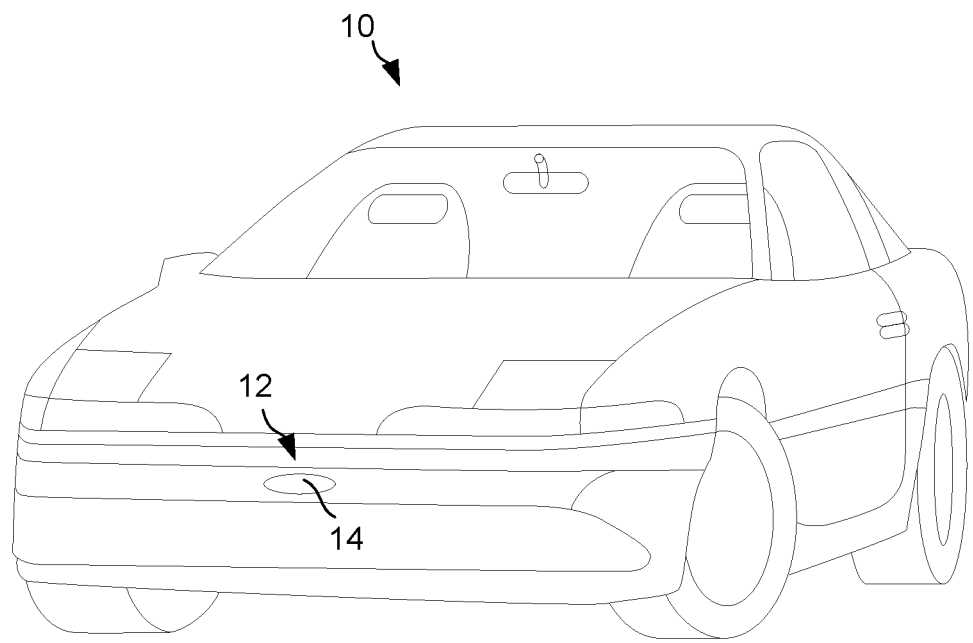
FIG. 1 is a perspective view of a vehicle with a sensing system that incorporates a radar sensor.

Referring now to the drawings and the illustrative embodiments depicted therein, a vehicle 10 (FIG. 1) includes a driving assistance system or sensing system 12 that includes at least one radar sensor unit, such as a forward facing radar sensor unit 14 (and the system may optionally include multiple exterior facing sensors, such as cameras, radar, or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) that includes a data processor that is operable to process data captured by the radar sensor(s). The sensing system may also include a radar sensor that includes plurality of transmitters that transmit radio signals via plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driving assist system of the vehicle, with the driving assist system controls at least one function or feature of the vehicle (such as to provide autonomous driving control of the vehicle) responsive to processing of the data captured by the radar sensors. The data transfer or signal communication from the sensor to the ECU may comprise any suitable data or communication link, such as a vehicle network bus or the like of the equipped vehicle.

Automotive radar is typically deployed at millimeter-wave frequency bands (e.g., 76-81 GHz) which requires an integrated radar module to be compact to offer high-performance. Due to the limited space required by the compactness, transmitting antenna elements (Tx) and receiving antenna elements (Rx) of the radar are co-located in the same general area and often are produced on the same platform (e.g., on the same printed circuit board (PCB) or on a body such as a metallic-coated plastic wave-guide antenna).

The mutual influence between Tx and Rx elements leads to a spill-over issue, where the power from the Tx elements is directly leaked to Rx elements. This spill-over/crossover degrades the performance of the radar (e.g., by saturating a low-noise amplifier of the Rx channels). Additionally, direct signals from Tx elements to Rx elements often require additional efforts to remove the signal in post-processing, which is not always available due to resource demands for other functions within the radar.

Some conventional solutions for spill-over include introducing a delay in the opening of the Rx channel, thus decreasing a power level of the signal from Tx to Rx. This solution is suboptimal, as it comes at the cost of limiting the radar to detect close by objects (i.e., limits the range of the radar). Another conventional solution is to physically separate the Tx antenna elements and the Rx antenna elements, which results in more parts for the radar (increasing the cost) and generally requires additional space for the Tx and the Rx antennas.

Implementations herein include a compact antenna design for an automotive millimeter wave radar system that offers high-isolation between Tx elements and Rx elements. The design includes Tx radiating elements and Rx receiving elements on the same platform (e.g., for metallic-coated plastic wave-guide antennas). This allows the design to provide required functionalities to the radar such as sending the signal and receiving the reflected signal from the target, while simultaneously eliminating the spill-over issue (i.e., the transmitted signal is confined without being directly received by the Rx elements).

Figure 2B:
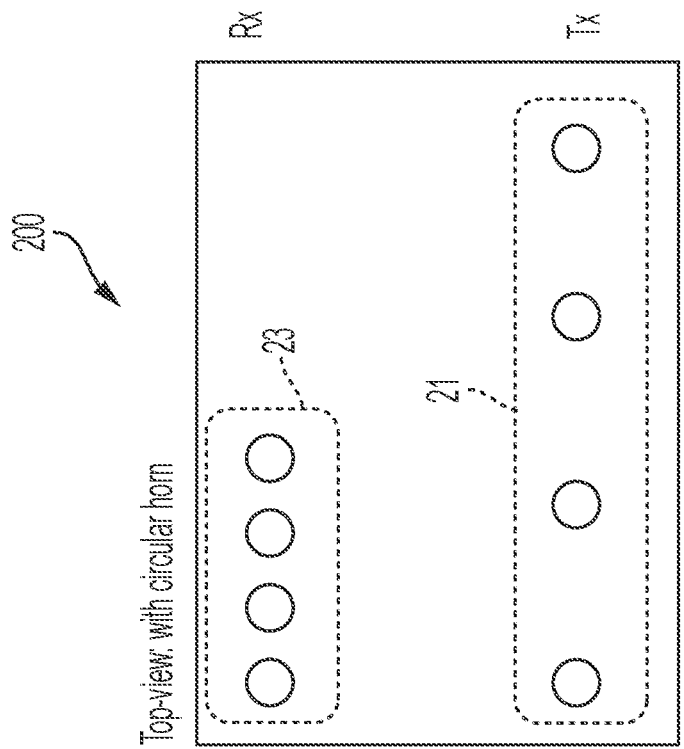
FIGS. 2A and 2B are top views of a radar module with rectangular and circular radar elements.
Figure 2A:
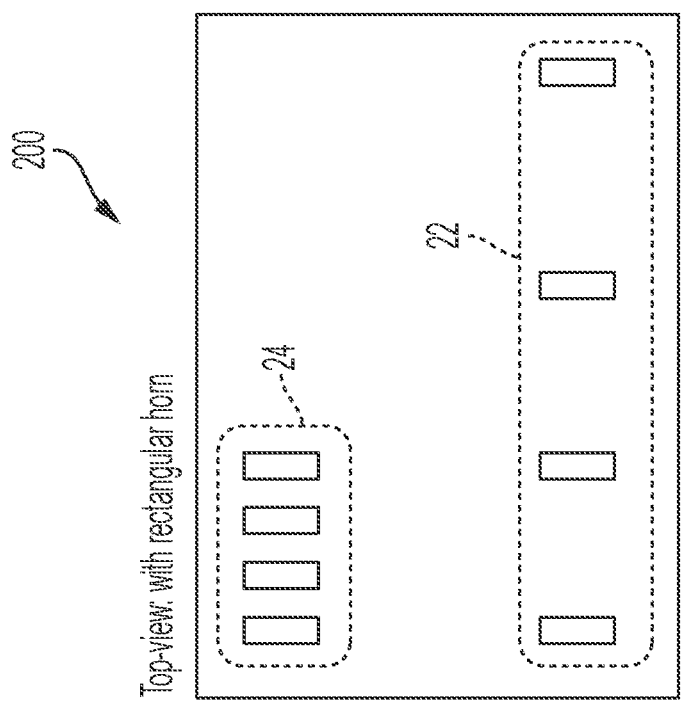

Referring now to FIGS. 2A and 2B, a radar module 200 (i.e., an antenna structure 200) consists of one or more radiating elements 21-24 (also referred to herein as transmitting ports and receiving ports) that send and receive radio frequency (RF) signals on one-side of an antenna body. The radar module 200 is designed to attach to a radar PCB. For example, the radar module 200 is attached or mounted to the PCB using screws or adhesive (or any other mechanical contact). Some antenna elements 22,24 may be rectangular shape (FIG. 2A) while other antenna elements 21,23 may be circular shape (FIG. 2B). Other shapes are possible as well, such as triangles, diamonds, ovals, etc. The antenna elements 21-24 may include any suitable shape that radiates a pattern with a field of view (FoV) required by the radar. The distribution of the antenna elements 21-24 may be arbitrary or in a predefined and certain way (e.g., in order to provide the best combination for multiple input and multiple output (MIMO) functionality of the radar).

Figure 3:
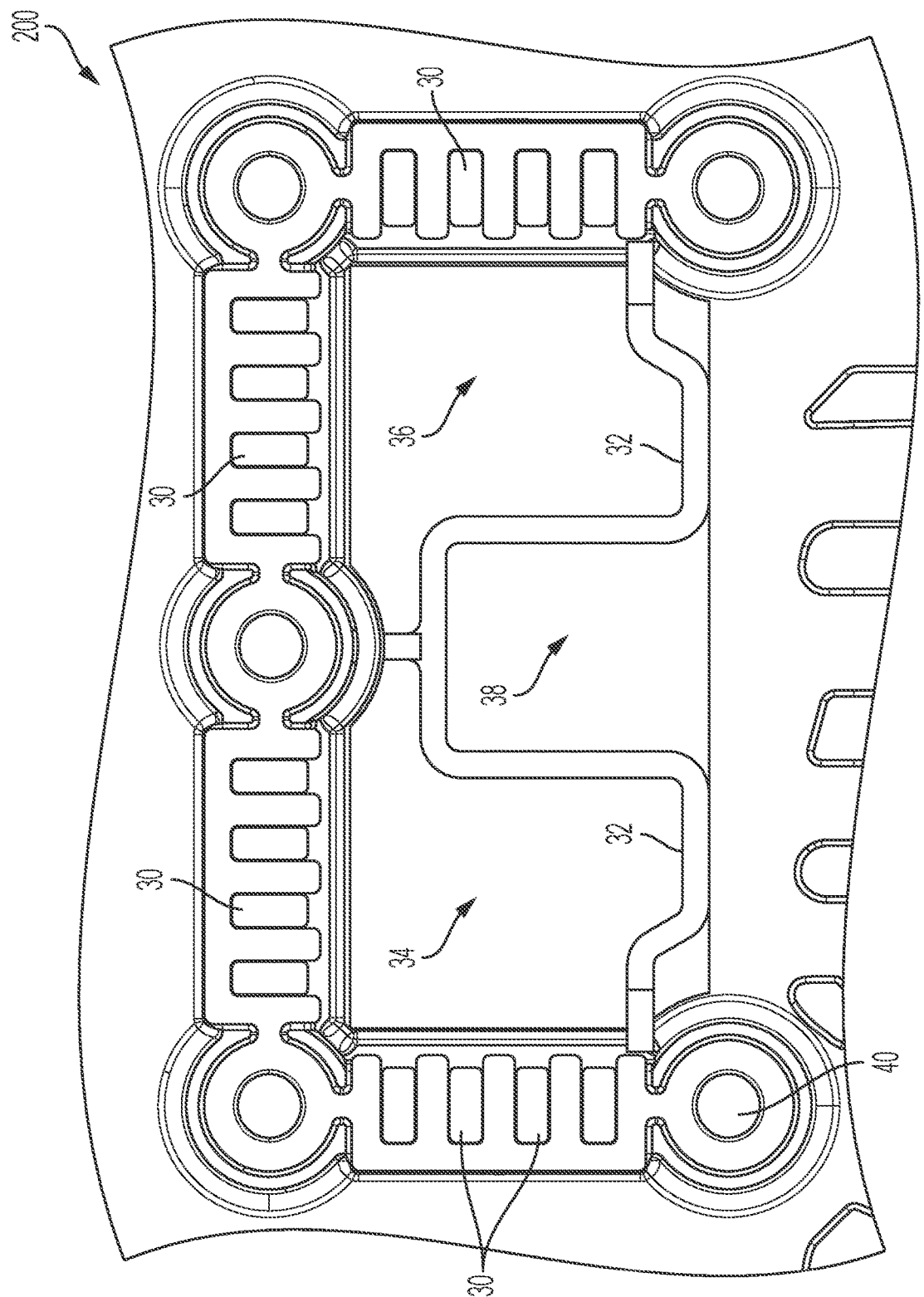
FIG. 3 is a bottom view of a radar module with waveguide ports and a wall.
Figure 4:
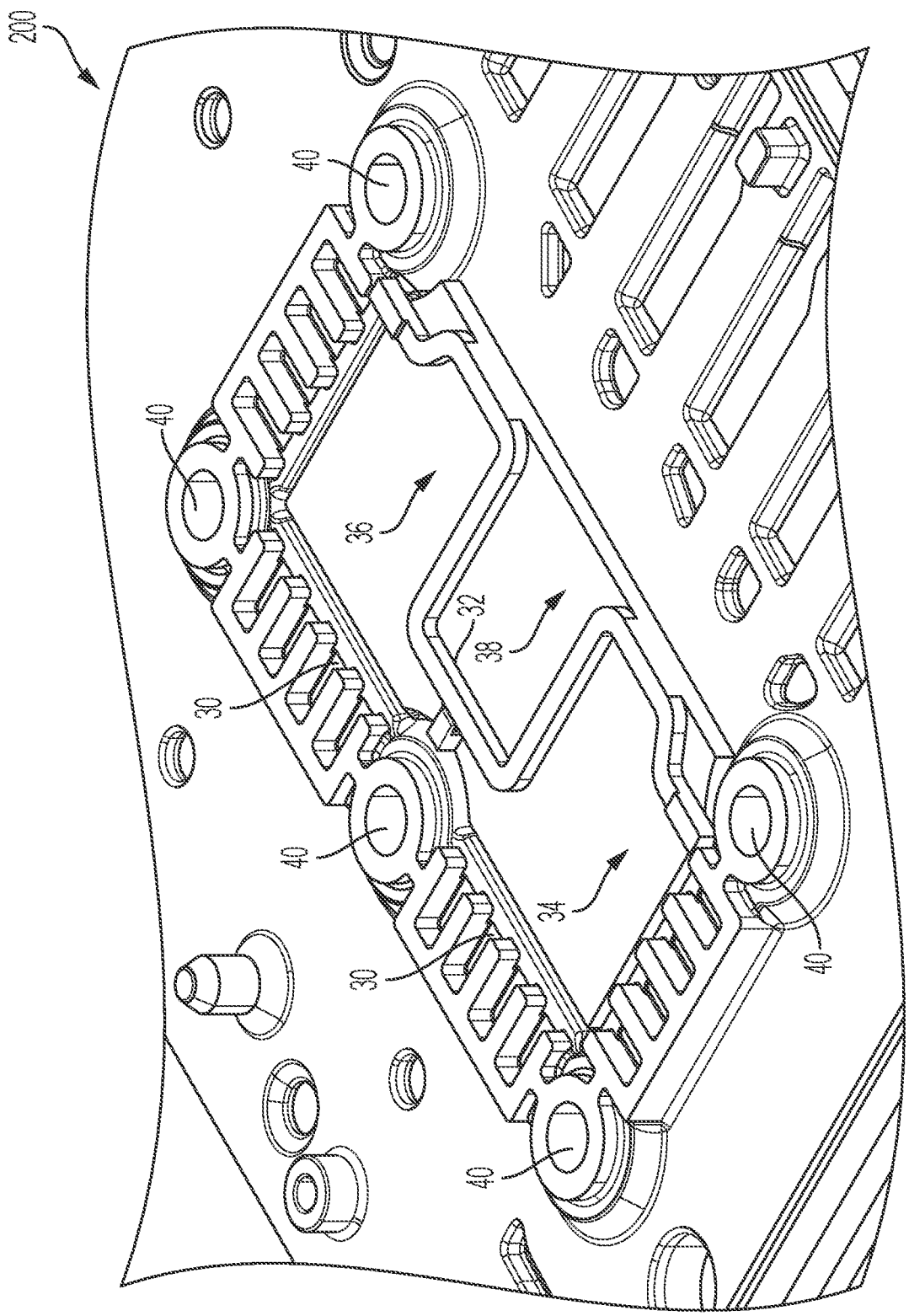
FIG. 4 is a perspective view of the radar module of FIG. 3.

Referring now to FIGS. 3 and 4, optionally, the radar module 200 includes one or more wave-guide structures (herein referred to as wave-guide ports 30) that are, for example, located on the opposite side of the module or body from the antenna elements (FIGS. 2A and 2B). The wave-guide ports 30 couple energy (i.e., radio signals) from the PCB of the radar (e.g., one or more radiating elements of the PCB that are near or align with the wave-guide ports 30 on a first side of the radar module 200) to the Tx and Rx antenna elements (e.g., through the radar module 200 and to a second side of the radar module 200) and to the PCB of the radar from the Tx and Rx antenna elements. Optionally, the wave-guide structure includes a Tx wave-guide port 30 for each corresponding Tx antenna element and a Rx wave-guide port 30 for each corresponding Rx antenna element. Optionally, the wave-guide structure includes a Tx wave-guide port 30 for each corresponding Tx antenna element but less Rx wave-guide ports 30 than Rx antenna elements or vice versa.

Optionally, one or more metallic walls 32 (i.e., wall structures) with various shapes, sizes, and forms are disposed in between the waveguide ports 30. The metallic wall(s) 32 isolate the field coupled by the Tx antenna and the Rx antenna. That is, the metallic wall(s) 32 reduce or eliminate the spill-over between the Rx antenna elements and the Tx antenna elements. The metallic wall 32 may be made of any metal or other EM blocking material. The wall 32 may include a variety of shapes and sizes. The wall 32 is configured to separate a first area 34 (e.g., a Tx area) from a second area 36 (e.g., an Rx area). That is, the first area 34 represents the area where the Tx waveguide ports 30 are located and the second area 36 represents the area where the Rx waveguide ports are located. In the example of FIG. 3, the first area 34 is approximately the same size as the second area 36, however one area may be larger than the other area (i.e., the Tx area may be larger than the Rx area or vice versa).

The wall 32 shields or isolates the first area 34 from the second area 36 to protect the Rx wave-guide ports 30 from spill-over of RF signals from Tx channels. The wall 32 may take various shapes and sizes, such as straight sections and/or curved sections as illustrated in FIGS. 3 and 4. In the example shown, the wall 32 is shaped to at least partially outline an integrated circuit (IC) chip area 38 (i.e., extend at least partially along/around a perimeter edge of the IC) disposed on the PCB (e.g., a processor) so that integration of the radar module 200 with the PCB is not impacted by the wall 32 (i.e., to keep the wall 32 from impacting the IC chip after the radar module 200 is mounted to the PCB). Optionally, the wall may act as a heat sink for one or more IC chips. Once attached to the PCB and the housing (e.g., via attachment points 40 using screws or other attaching means between the radar module 200 and the PCB), the metallic wall(s) 32 of the antenna module 200 form (with a surface of the PCB and a surface of the radar module 200) the first area 34 (i.e., the Tx area with the Tx wave-guide ports 30) that is isolated from the second area 36 (i.e., the Rx area with the Rx wave-guide ports 30), thus completely avoiding mutual interference of the Tx signals and the Rx channels.

Thus, when the radar sensor is transmitting, the generated signals travel from the IC chip (disposed on the PCB) to a wave-guide port 30 (via a surface of the PCB). From the wave-guide port 30, the signal travels to the Tx antenna elements 21, 22, then to the target which is remote from the radar module 200 (e.g., within the environment of the radar module 200). Due to the metallic walls 32, the wave-guide ports 32 in the second area 36 are completely shielded from the Tx transmissions (i.e., the Rx antenna elements will not receive spill-over from the Tx signals).

When the radar sensor is receiving, the signals received by the Rx antenna elements are coupled via the Rx wave-guide ports 30 to the PCB surface, and from the PCB surface to the IC. The metallic walls 32 in this case help to prevent the signal being coupled back to the Tx antenna elements, which then may return again to the Rx channel, causing an increase in noise.

Optionally, the radar module may be formed using a standard process of injection molding or similar technologies, where the metallic walls are part of the antennas. Thus, no insertion is needed, keeping the cost and the integration as straight forward as a conventional metallic-coated wave guide antenna. The antenna may be attached to the PCB, where the metallic wall 32 comes into contact with the PCB surface, forming the shielded first area 34 and the shielded second area 36, isolating the Tx wave-guide ports from the Rx wave-guide ports 30.

The design may be integrated directly with other components, such as the PCB, the housing of a radar system, or any other conventional component. Thus, implementations herein include a viable solution for spill-over issues that do not reduce power of the channels or require additional components and/or space. The radar module 200 permits use of a high-performance radar while also keeping the module compact within a limited space.

Figure 5:
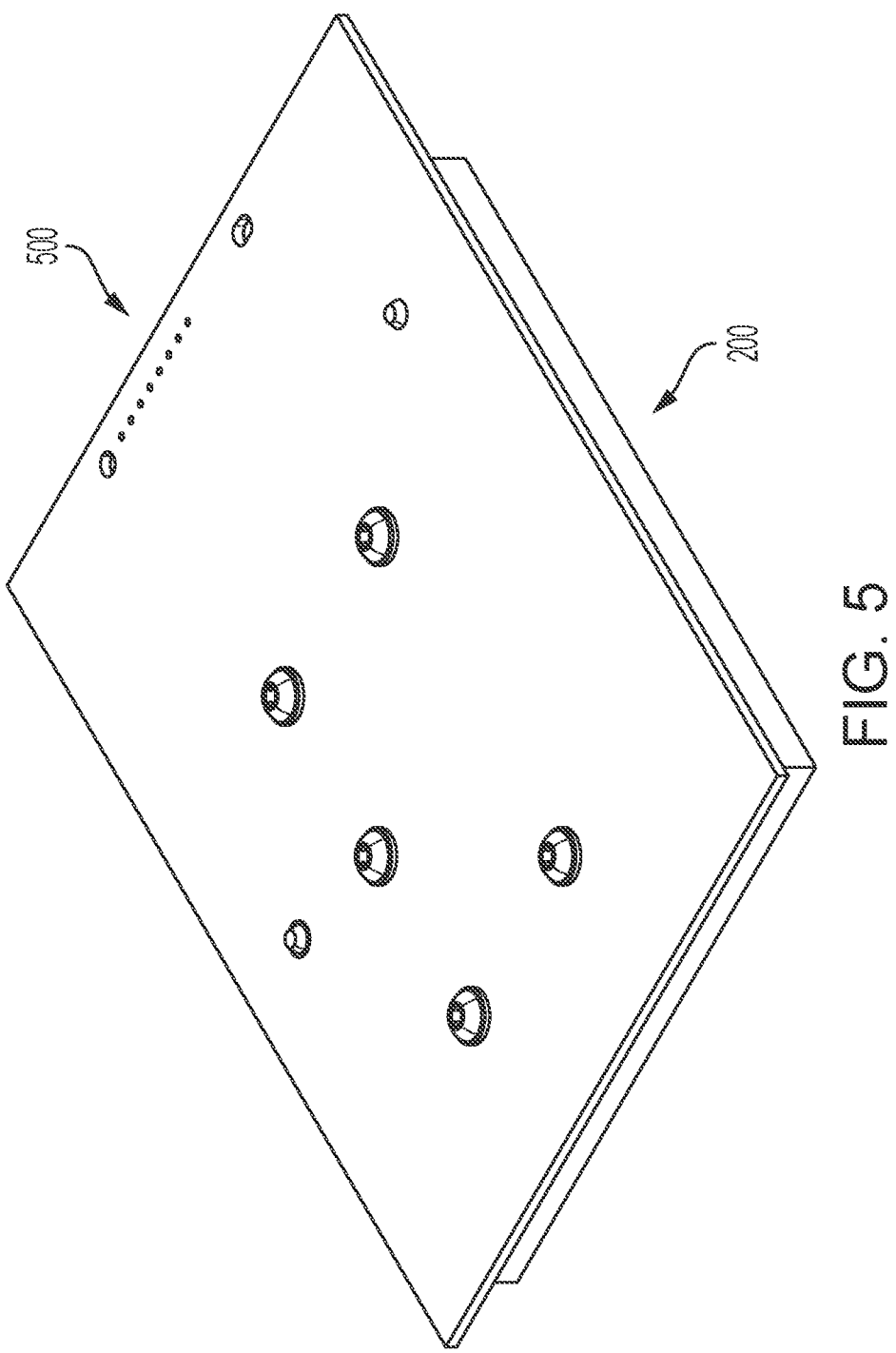
FIGS. 5 and 6 are perspective views of the radar module of FIG. 3 integrated with a printed circuit board.
Figure 6:
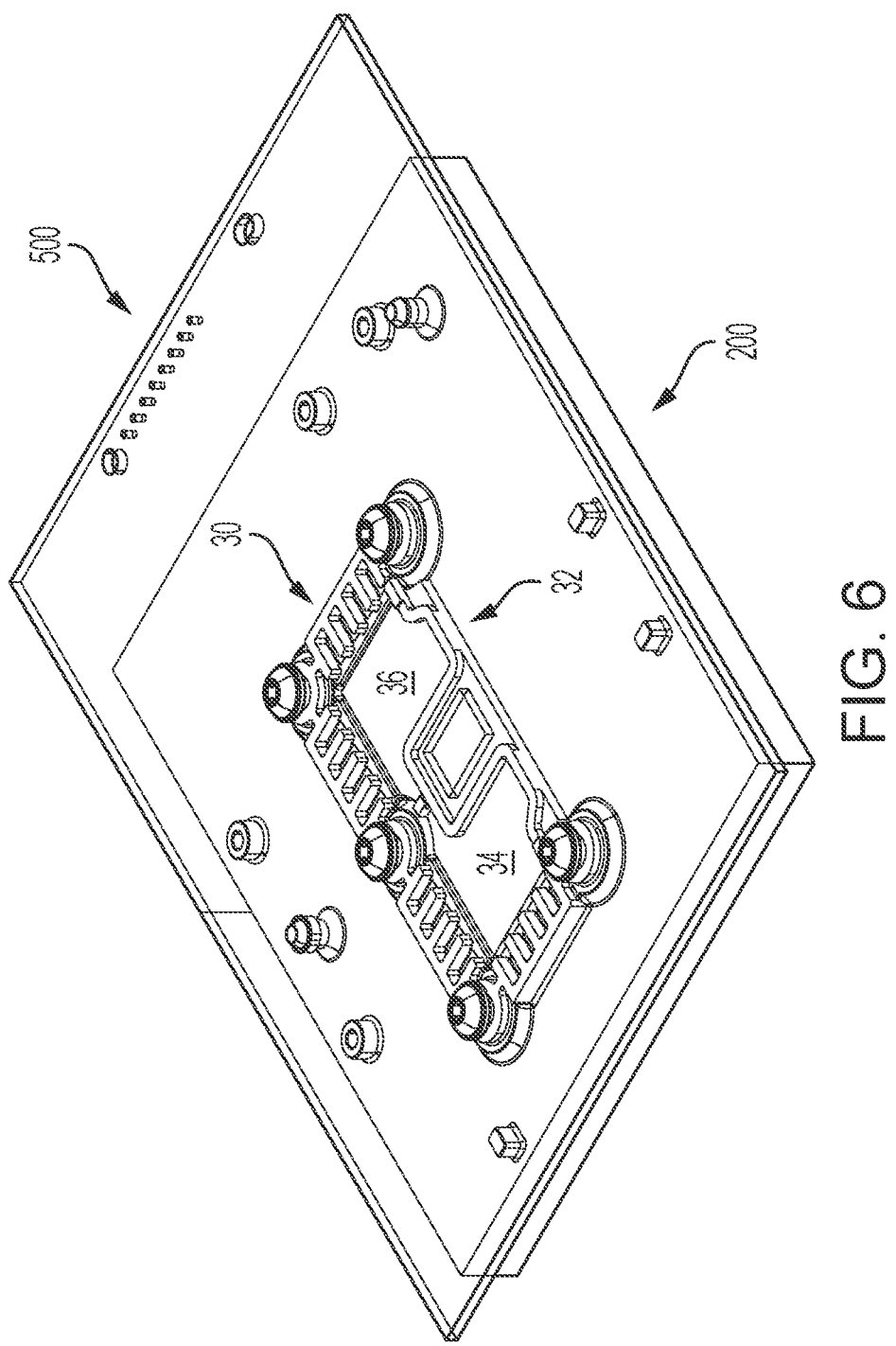

FIG. 5 shows a back-view of an integration between the radar module 200 and a PCB 500. Here, the radar module 200 is mounted to the PCB via multiple screws that ensure contact between the wall(s) 32 of the radar module 200 and the PCB 500. FIG. 6 shows a back-view of the integration of the radar module 200 with the PCB 500, shown with the PCB 500 partially transparent for additional clarity. As can be seen in FIG. 6, the walls 32 isolate the wave-guide ports 30 of the first area 34 from the wave-guide ports 30 of the second area 36 while providing room for an IC. The walls and/or surface of the radar module 200 may act as a heat sink for one or more ICs of the PCB 500. FIG. 7 shows a side-view of the integration of the radar module 200 with the PCB 500. Here, an IC chip 70 is well positioned between the curves of the wall 32. Thus, the radar module 200 allows for isolation between Tx channels and Rx channels to reduce or eliminate spill-over while maintaining a simple and cost effective package.

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular radar sensing system, the vehicular radar sensing system comprising:
   a radar sensor disposed at a vehicle, wherein the radar sensor is operable to sense exterior of the vehicle;
   wherein the radar sensor comprises a single printed circuit board (single PCB) comprising electronic circuitry and associated software;
   wherein the electronic circuitry comprises (i) a plurality of transmitters that transmit radio signals and (ii) a plurality of receivers that receive the transmitted radio signals, and wherein the plurality of transmitters and the plurality of receivers are disposed on the single PCB;
   wherein the electronic circuitry comprises a processor disposed at a first side of the single PCB, and wherein the processor is operable to process outputs of the plurality of receivers;
   wherein the radar sensor comprises an antenna structure, and wherein a first side of the antenna structure is mounted at the first side of the single PCB;
   wherein the antenna structure comprises (i) a transmitting port for at least one transmitter of the plurality of transmitters and (ii) a receiving port for at least one receiver of the plurality of receivers;
   wherein the antenna structure comprises a metallic wall structure that extends from the first side of the antenna structure to physically contact a surface of the first side of the single PCB, and wherein the wall structure and the first side of the single PCB cooperate to at least partially define a transmitting area and a receiving area on the surface of the first side of the single PCB, and wherein the wall structure, the first side of the antenna structure and the first side of the single PCB isolate radio frequency signals at the transmitting area from radio frequency signals at the receiving area;
   wherein the antenna structure comprises a transmitting wave-guide that guides transmitted radio signals from the at least one transmitter through the transmitting area to the transmitting port; and
   wherein the antenna structure comprises a receiving wave-guide that guides received radio signals from the receiving port through the receiving area to the at least one receiver.

2. The vehicular radar sensing system of claim 1, wherein the antenna structure comprises a body formed of a non-metallic material.

3. The vehicular radar sensing system of claim 1, wherein the antenna structure comprises a different transmitting port for each transmitter of the plurality of transmitters.

4. The vehicular radar sensing system of claim 1, wherein the transmitting port radiates the radio signals from the at least one transmitter to the environment exterior of the radar sensor.

5. The vehicular radar sensing system of claim 1, wherein the transmitting port comprises a first rectangular shape and the receiving port comprises a second rectangular shape.

6. The vehicular radar sensing system of claim 1, wherein the transmitting port comprises a first circular shape and the receiving port comprises a second circular shape.

7. The vehicular radar sensing system of claim 1, wherein the wall structure comprises a shape that, with the antenna structure mounted at the first side of the single PCB, extends at least partially around a perimeter edge of the processor.

8. The vehicular radar sensing system of claim 1, wherein the antenna structure is mounted at the first side of the single PCB via one or more screws.

9. The vehicular radar sensing system of claim 1, wherein the transmitting wave-guide is disposed at the first side of the antenna structure and the transmitting port is disposed at a second side of the antenna structure, and wherein the second side of the antenna structure is opposite the first side of the antenna structure.

10. The vehicular radar sensing system of claim 1, wherein the receiving wave-guide is disposed at the first side of the antenna structure and the receiving port is disposed at a second side of the antenna structure, and wherein the second side of the antenna structure is opposite the first side of the antenna structure.

11. The vehicular radar sensing system of claim 1, wherein the antenna structure is injection-molded.

12. A vehicular radar sensing system, the vehicular radar sensing system comprising:
- a radar sensor disposed at a vehicle, wherein the radar sensor is operable to sense exterior of the vehicle;
- wherein the radar sensor comprises a single printed circuit board (single PCB) comprising electronic circuitry and associated software;
- wherein the electronic circuitry comprises (i) a plurality of transmitters that transmit radio signals and (ii) a plurality of receivers that receive the transmitted radio signals, and wherein the plurality of transmitters and the plurality of receivers are disposed on the single PCB;
- wherein the electronic circuitry comprises a processor disposed at a first side of the single PCB, and wherein the processor is operable to process outputs of the plurality of receivers;
- wherein the radar sensor comprises an antenna structure, and wherein a first side of the antenna structure is mounted at the first side of the single PCB;
- wherein the antenna structure comprises (i) a transmitting port for at least one transmitter of the plurality of transmitters and (ii) a receiving port for at least one receiver of the plurality of receivers;
- wherein the antenna structure comprises a metallic wall structure that extends from the first side of the antenna structure to physically contact a surface of the first side of the single PCB, and wherein the metallic wall structure and the first side of the single PCB cooperate to at least partially define a transmitting area and a receiving area, and wherein the metallic wall structure, the first side of the antenna structure and the first side of the single PCB isolate radio frequency signals at the transmitting area from radio frequency signals at the receiving area, and wherein the metallic wall structure comprises a shape that, with the antenna structure mounted at the first side of the single PCB, extends at least partially around a perimeter edge of the processor;
- wherein the antenna structure comprises a transmitting wave-guide that guides transmitted radio signals from the at least one transmitter through the transmitting area to the transmitting port; and
- wherein the antenna structure comprises a receiving wave-guide that guides received radio signals from the receiving port through the receiving area to the at least one receiver.

13. The vehicular radar sensing system of claim 12, wherein the antenna structure comprises a different transmitting port for each transmitter of the plurality of transmitters.

14. The vehicular radar sensing system of claim 12, wherein the transmitting port radiates the radio signals from the at least one transmitter to the environment exterior of the radar sensor.

15. The vehicular radar sensing system of claim 12, wherein the transmitting port comprises a first rectangular shape and the receiving port comprises a second rectangular shape.

16. The vehicular radar sensing system of claim 12, wherein the transmitting port comprises a first circular shape and the receiving port comprises a second circular shape.

17. A vehicular radar sensing system, the vehicular radar sensing system comprising:
- a radar sensor disposed at a vehicle, wherein the radar sensor is operable to sense exterior of the vehicle;
- wherein the radar sensor comprises a single printed circuit board (single PCB) comprising electronic circuitry and associated software;
- wherein the electronic circuitry comprises (i) a plurality of transmitters that transmit radio signals and (ii) a plurality of receivers that receive the transmitted radio signals, and wherein the plurality of transmitters and the plurality of receivers are disposed on the single PCB;
- wherein the electronic circuitry comprises a processor disposed at a first side of the single PCB, and wherein the processor is operable to process outputs of the plurality of receivers;
- wherein the radar sensor comprises an antenna structure, and wherein a first side of the antenna structure is mounted at the first side of the single PCB, and wherein the antenna structure is mounted at the first side of the single PCB via one or more screws, and wherein at least a portion of the antenna structure is non-metallic;
- wherein the antenna structure comprises (i) a transmitting port for at least one transmitter of the plurality of transmitters and (ii) a receiving port for at least one receiver of the plurality of receivers;
- wherein the antenna structure comprises a metallic wall structure that extends from the first side of the antenna structure to physically contact a surface of the first side of the single PCB, and wherein the wall structure and the first side of the single PCB cooperate to at least partially define a transmitting area and a receiving area, and wherein the wall structure, the first side of the antenna structure and the first side of the single PCB isolate radio frequency signals at the transmitting area from radio frequency signals at the receiving area;
- wherein the antenna structure comprises a transmitting wave-guide that guides transmitted radio signals from the at least one transmitter through the transmitting area to the transmitting port; and
- wherein the antenna structure comprises a receiving wave-guide that guides received radio signals from the receiving port through the receiving area to the at least one receiver.

18. The vehicular radar sensing system of claim 17, wherein the transmitting wave-guide is disposed at the first side of the antenna structure and the transmitting port is disposed at a second side of the antenna structure, and wherein the second side of the antenna structure is opposite the first side of the antenna structure.

19. The vehicular radar sensing system of claim 17, wherein the receiving wave-guide is disposed at the first side of the antenna structure and the receiving port is disposed at a second side of the antenna structure, and wherein the second side of the antenna structure is opposite the first side of the antenna structure.

20. The vehicular radar sensing system of claim 17, wherein the antenna structure is injection-molded.

\* \* \* \* \*